(12) United States Patent
Kidd

(10) Patent No.: US 8,402,728 B2
(45) Date of Patent: Mar. 26, 2013

(54) GUIDE ARRANGEMENT FOR THE DRAPER OF A COMBINE HARVESTER PICK-UP

(75) Inventor: Bruce Kidd, Winnipeg (CA)

(73) Assignee: MacDon Industries Ltd., Winnipeg, MB (CA)

( * ) Notice: Subject to any disclaimer, the term of this patent is extended or adjusted under 35 U.S.C. 154(b) by 132 days.

(21) Appl. No.: 12/823,588

(22) Filed: Jun. 25, 2010

(65) Prior Publication Data
US 2011/0315524 A1 Dec. 29, 2011

(51) Int. Cl.
A01D 45/02 (2006.01)
(52) U.S. Cl. .......... 56/119; 56/364; 56/328.1; 56/327.1; 198/844.2; 198/844.1
(58) Field of Classification Search .............. 198/844.2, 198/844.1, 847; 56/208, 181, 364, 119, 327.1, 56/328.1
See application file for complete search history.

(56) References Cited

U.S. PATENT DOCUMENTS

| | | | | |
|---|---|---|---|---|
| 4,304,089 A * | 12/1981 | Mescheryakov et al. | ........ | 56/364 |
| 4,463,546 A * | 8/1984 | Day | ................................ | 56/364 |
| 4,560,060 A * | 12/1985 | Lenhart | ........................ | 198/803.5 |
| 4,965,993 A * | 10/1990 | Butler et al. | ................. | 56/327.1 |
| 5,090,187 A * | 2/1992 | Mews | .............................. | 56/364 |
| 5,459,986 A * | 10/1995 | Talbot et al. | .................... | 56/181 |
| 5,822,959 A * | 10/1998 | Norton | ................................ | 56/1 |
| 6,131,728 A | 10/2000 | Rizhanovsky | | |
| 6,351,931 B1 * | 3/2002 | Shearer | .......................... | 56/181 |
| 7,344,020 B2 | 3/2008 | Grywacheski | | |
| 7,472,533 B2 * | 1/2009 | Talbot et al. | ..................... | 56/181 |
| 7,866,136 B1 * | 1/2011 | Hill et al. | ......................... | 56/364 |
| 8,002,110 B2 * | 8/2011 | DeGroot et al. | ............ | 198/844.2 |
| 8,266,881 B2 * | 9/2012 | McIlwain | ......................... | 56/208 |
| 2006/0278499 A1 * | 12/2006 | Grywacheski et al. | ..... | 198/844.2 |
| 2007/0193243 A1 * | 8/2007 | Schmidt et al. | .................. | 56/181 |
| 2007/0204584 A1 * | 9/2007 | Coers et al. | ..................... | 56/15.8 |
| 2007/0204589 A1 * | 9/2007 | Coers et al. | ..................... | 56/208 |
| 2008/0092508 A1 * | 4/2008 | Talbot et al. | ..................... | 56/181 |
| 2008/0271426 A1 * | 11/2008 | Lohrentz et al. | ................ | 56/153 |
| 2009/0007533 A1 * | 1/2009 | Lovett et al. | ................... | 56/14.5 |
| 2009/0084080 A1 * | 4/2009 | Coers et al. | ..................... | 56/15.8 |
| 2009/0266044 A1 * | 10/2009 | Coers et al. | ..................... | 56/208 |
| 2009/0288383 A1 * | 11/2009 | Sauerwein et al. | ............. | 56/181 |
| 2009/0308042 A1 * | 12/2009 | Lovett et al. | .................... | 56/153 |
| 2010/0269472 A1 * | 10/2010 | Coers et al. | ..................... | 56/15.8 |
| 2010/0313540 A1 * | 12/2010 | Sauerwein et al. | ............. | 56/181 |
| 2012/0042617 A1 * | 2/2012 | Dow et al. | ....................... | 56/14.5 |
| 2012/0096825 A1 * | 4/2012 | Sauerwein et al. | ............. | 56/181 |
| 2012/0137645 A1 * | 6/2012 | Sauerwein et al. | ............. | 56/181 |

* cited by examiner

*Primary Examiner* — Árpád Fábián-Kovács
(74) *Attorney, Agent, or Firm* — Adrian D. Battison; Ade & Company Inc.

(57) ABSTRACT

A draper assembly for a crop pick-up has an endless draper belt assembly wrapped around a smaller front roller and a larger rear drive roller where the endless draper belt assembly is formed by four endless belts connected side by side at spaced positions along their length for common movement around the rollers. A tracking guide device is defined by a plurality of plastic guide elements mounted in a row on an inside surface of one belt at longitudinally spaced positions along the belt length which cooperates with a groove in the drive roller so that there are least two guide elements in the groove at any point in time. The guide elements are wider than their length and can be fastened through the belt so as to connect to the mounting of some of the fingers on the exterior of the belt.

19 Claims, 7 Drawing Sheets

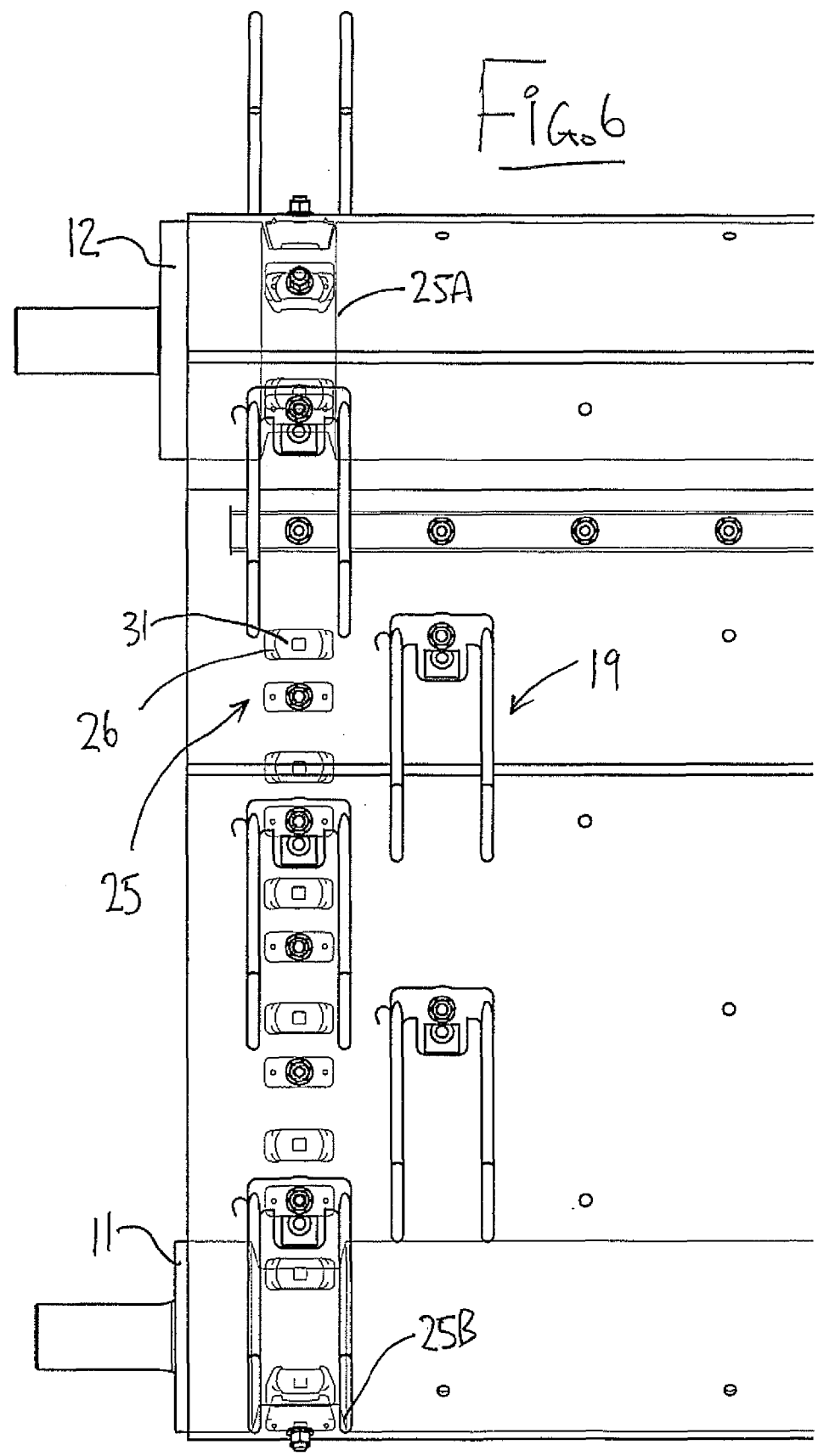

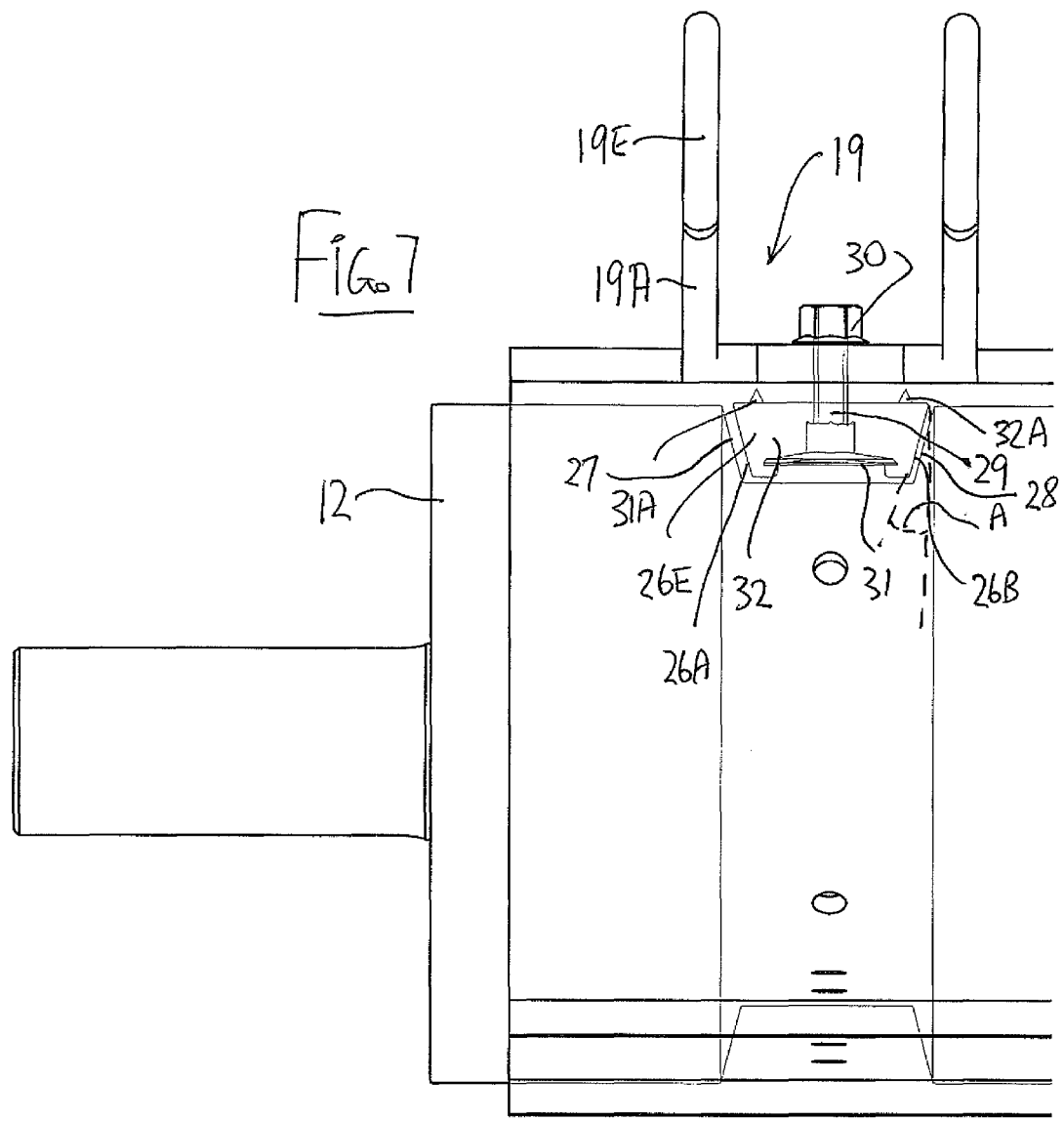

GUIDE ARRANGEMENT FOR THE DRAPER OF A COMBINE HARVESTER PICK-UP

This invention relates to a draper arrangement of a crop pick-up for a harvesting machine and particularly a combine harvester for picking up a swath of harvested crop for feeding into a feeder house of the combine harvester.

BACKGROUND OF THE INVENTION

Typical drapers of pick-ups for a combine include a plurality of side by side joined endless belts wrapped around front and rear parallel spaced rollers where one of the front and rear rollers is a driven roller to drive the belts to carry crop rearwardly from the front roller to the rear roller.

The draper belt arrangements of a combine pickup available on the market typically have tracking and slippage issues in that the belt arrangement must be guided to properly track around the front and rear rollers and must be driven in a manner which limits slippage of the belts on the driven roller. Tracking of drapers currently is done by guiding disks on the exterior surface of the rollers or in some cases by adjusting the position and/or tension of the outer roller supports. In such pick-ups the twisting of the deck as it moves across the ground combined with the short distance between the front and rear rollers causes the draper to wander laterally. At the same time there is a tendency for the belts to slip relative to the driven roller so that the feed rate changes in an unacceptable manner.

The slippage issue is determined to be a result of roller deflection due to the draper tension causing the middle draper belts to have less tension than the outer belts. Solutions to the deflection of these long rollers include having roller diameter which is larger in the center with respect to outer ends, changing one long roller into two shorter rollers or pusher devices to limit deflection of roller. All these solutions not only are not cost effective but have not adequately functionally performed.

In U.S. Pat. No. 6,131,728 (Rizhanovsky) issued Oct. 17, 2000 to Precision Metal shows an end to end connection for the ends of a draper suitable to be used on a pick-up of this type.

In U.S. Pat. No. 7,344,020 (Grywacheski) issued Mar. 18, 2008 to Deere shows another connection for a draper suitable to be used on a pick-up of this type.

Neither of these patents addresses the issues of slippage or guidance.

SUMMARY OF THE INVENTION

It is one object of the invention to provide an improved draper arrangement for a crop pick-up.

According to one aspect of the invention there is provided a crop pick-up for a harvesting machine comprising:
 a front roller;
 a rear roller parallel to and spaced from the front roller;
 one of the front and rear rollers being a driven roller for driven rotation around its axis;
 a joined endless draper belt assembly wrapped around the front and rear rollers so that rotation of the driven roller acts to drive the belt assembly to carry crop rearwardly from the front roller to the rear roller;
 the joined endless draper belt assembly comprising a plurality of joined endless belts arranged side by side across the front and rear rollers so as to define two outer belts and at least one intermediate belt;
 each belt comprising a belt length wrapped around the rollers and connected at ends of the belt length to form the respective endless belt;
 each endless belt being connected to its respective next adjacent endless belts at spaced positions along its length so as to connect the endless belts for common movement around the rollers;
 wherein there is provided a tracking guide device defined by a peripherally extending guide groove in at least one of the front and rear rollers and a guide assembly mounted on an inside surface of one of the endless belts for tracking in the guide groove.

Preferably the tracking guide device is defined by a plurality of guide elements mounted in a row on an inside surface of the endless draper belt assembly at longitudinally spaced positions along the belt length.

Preferably the groove is formed in the drive roller which is typically the larger rear roller.

Preferably the groove has tapered side walls with the taper being in the range 10 to 20 degrees and preferably of the order of 15 degrees.

Preferably the guide elements are wider in the transverse direction than they are long in the longitudinal direction and are typically less than 20 mm in length and preferably of the order of 16 mm to enable the belt to conform to the roller diameter and are typically greater than 30 mm in width and preferably of the order of 36 mm.

Preferably the guide elements are fastened by a single bolt through the guide element and through the belt for connection to a nut on the outer face of the draper belt. Preferably the bolt has a head which is recessed into an interior of the guide element.

Preferably the guide elements have at least one and preferably two prong protrusions at a side of the bolt that engage or bite into the draper to prevent rotation of the guide element on the draper.

Typically the belt assembly carries a plurality of spaced finger members on an exterior surface thereof and the bolt connecting the guide elements to the belt assembly also is used to attach a respective one of the finger members. As there generally needs to be more guide elements than fingers, the row of guide elements includes at least one additional guide element between each finger member and the next.

Preferably the guide elements are formed of a plastics material so as to provide a suitable bearing surface relative to the metal rollers.

Preferably the guide elements have a depth into the groove of at least 10 mm and preferably of the order of 14 mm to not only contain the guide element inside the roller groove but also to sufficient surface area on sides of the guide element relative to the groove to achieve acceptable wear.

Preferably the endless belts are connected side by side by transverse connecting bars to essentially make the belt assembly functionally rotate around the rollers as a one piece assembly. Thus the endless belts can be connected by a splicing connector connecting the ends of the belt lengths and spanning across from one belt to the next, with the splicing connector preferably extending from a mid span of one belt to a mid span of the next. Thus the endless belts can be connected additionally by a series of plates at longitudinally spaced positions along the belts and spanning the edges of the belts.

In order to even out tension in the belts while accommodating some bowing of the rollers, at least one intermediate belt is connected such that the belt length thereof is shorter than the belt length of the two side belts. Typically there are four belts and the two intermediate belts are shorter than the side belts.

According to a second aspect of the invention there is provided a crop pick-up for a harvesting machine comprising:
a front roller;
a rear roller parallel to and spaced from the front roller;
one of the front and rear rollers being a driven roller for driven rotation around its axis;
an endless draper belt assembly wrapped around the front and rear rollers so that rotation of the driven roller acts to drive the belt assembly to carry crop rearwardly from the front roller to the rear roller;
the endless draper belt assembly comprising a plurality of endless belts arranged side by side across the front and rear rollers so as to define two side belts and at least one intermediate belt;
each belt comprising a belt length wrapped around the rollers and connected at ends of the belt length to form the respective endless belt;
each endless belt being connected to its respective next adjacent endless belts at spaced positions along its length so as to connect the endless belts for common movement around the rollers;
wherein at least one intermediate belt is connected such that the belt length thereof is shorter than the belt length of the two side belts.

According to a third aspect of the invention there is provided a crop pick-up for a harvesting machine comprising:
a front roller;
a rear roller parallel to and spaced from the front roller;
one of the front and rear rollers being a driven roller for driven rotation around its axis;
an endless draper belt assembly wrapped around the front and rear rollers so that rotation of the driven roller acts to drive the belt assembly to carry crop rearwardly from the front roller to the rear roller;
the endless draper belt assembly comprising a belt length wrapped around the rollers and connected at ends of the belt length;
wherein there is provided a tracking guide device defined by a peripherally extending guide groove in at least one of the front and rear rollers and a guide assembly defined by a plurality of guide elements mounted on an inside surface of the endless draper belt assembly at longitudinally spaced positions along the belt length for tracking in the guide groove.

BRIEF DESCRIPTION OF THE DRAWINGS

One embodiment of the invention will now be described in conjunction with the accompanying drawings in which:

FIG. 6 is a top plan view of the intermediate part only of the embodiment of FIG. 1.

FIG. 7 is a cross sectional view along the lines 7-7 of FIG. 4.

In the drawings like characters of reference indicate corresponding parts in the different figures.

DETAILED DESCRIPTION

Figure 1:
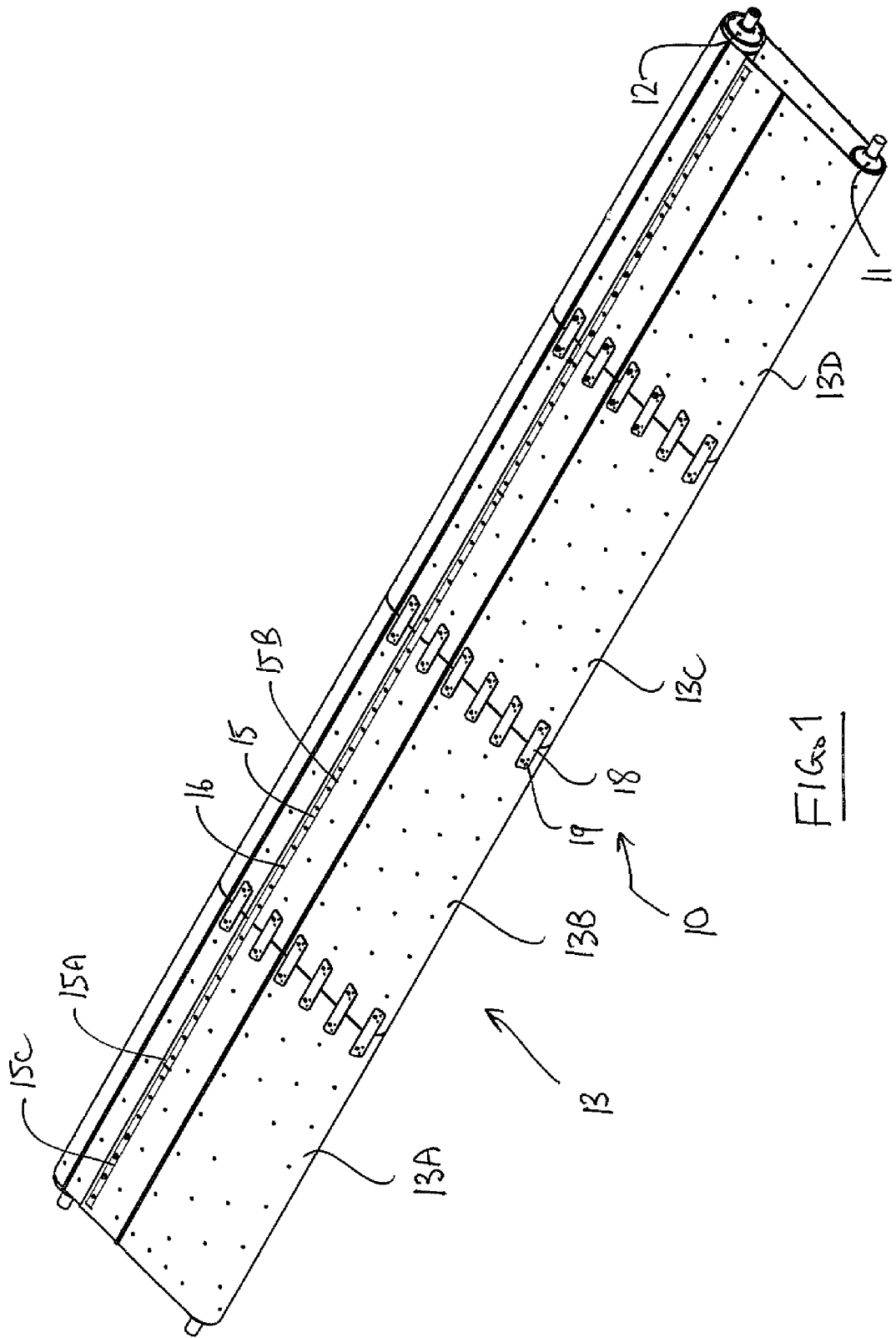
FIG. 1 is an isometric view of one embodiment of a pick-up according to the present invention with the support and drive assemblies for the rollers carrying the draper belts being omitted for convenience of illustration.

The crop pick-up 10 of the embodiment shown in the drawings includes a front roller 11 and a rear driven roller 12 parallel to and spaced from the front roller 11.

An endless draper belt assembly 13 is wrapped around the front roller 11 and rear roller 12 so that rotation of the driven roller in the direction D1 acts to drive the belt assembly in the upward rear direction D2 to carry crop rearwardly from the front roller to the rear roller. The endless draper belt assembly is formed by four belts 13A, 13B, 13C and 13D arranged side by side across the rollers so as to define two side belts 13A, 13D and two intermediate belts 13B, 13C.

Figure 4:
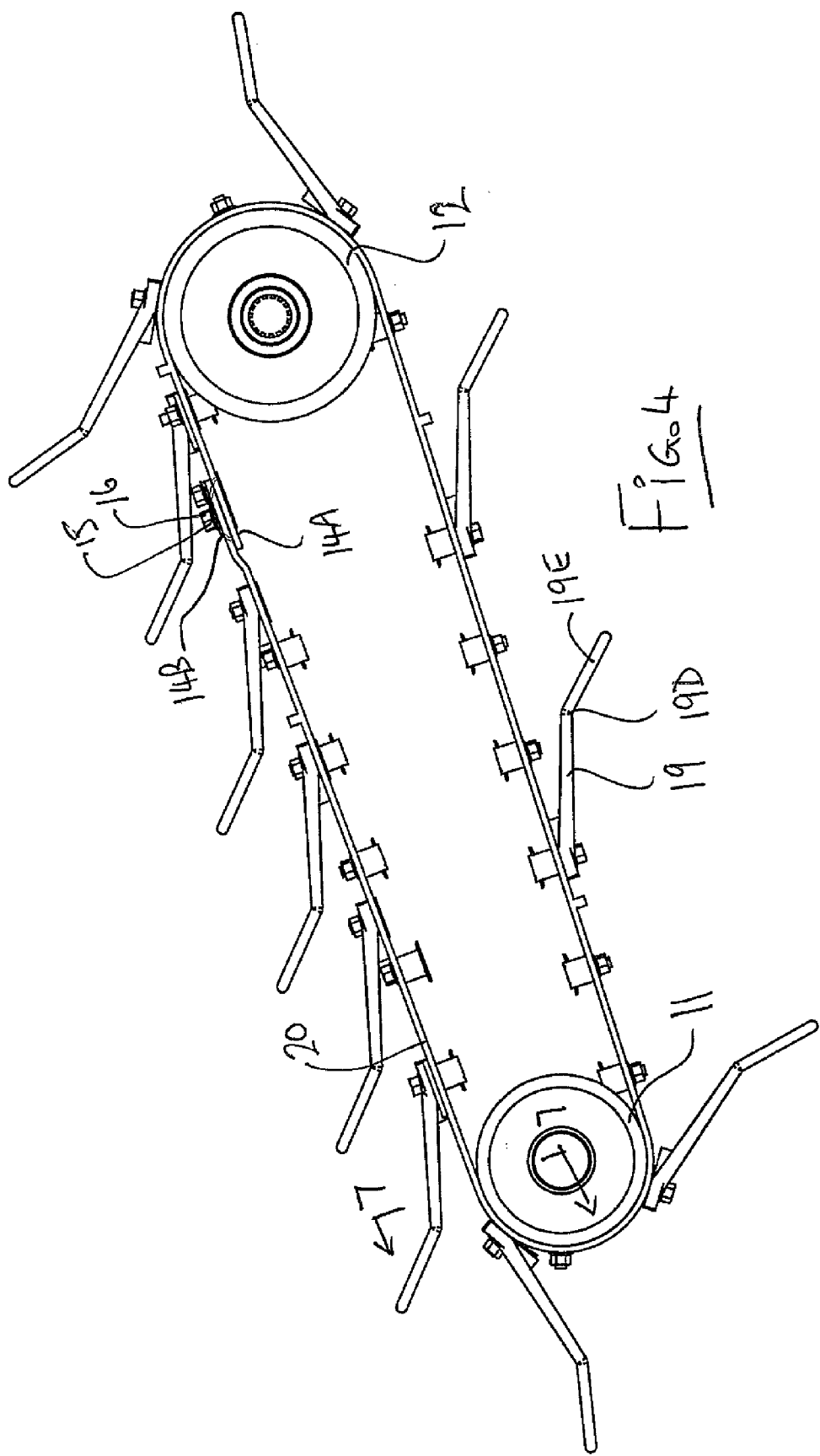
FIG. 4 is an end elevational view of the embodiment of FIG. 1.
Figure 5:
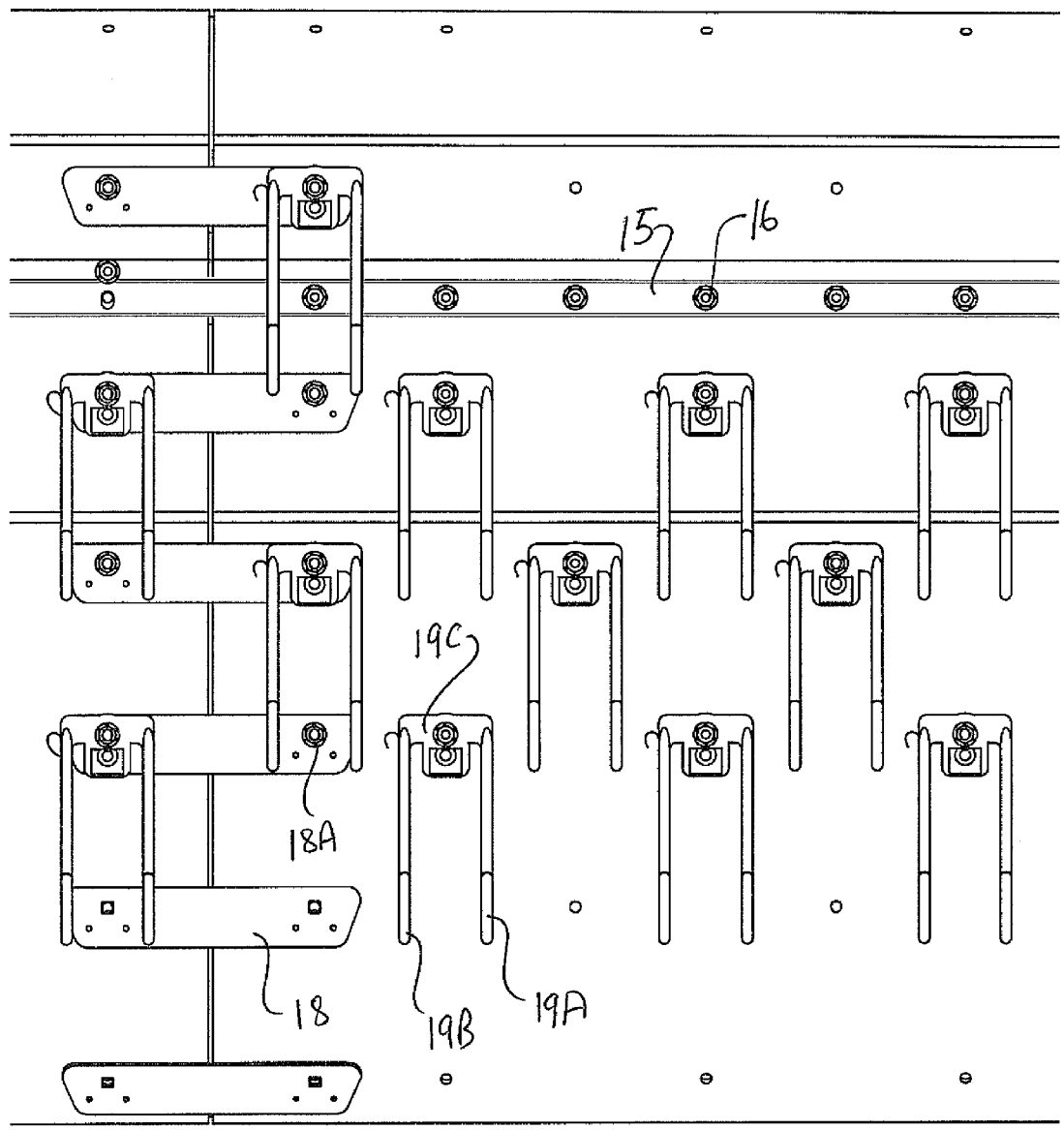
FIG. 5 is a top plan view of the intermediate part only of the embodiment of FIG. 1.

As shown in FIG. 4, each belt is formed by a belt length 14 with ends 14A and 14B wrapped around the rollers and connected at the ends of the belt length by a connector strip 15 attached by a row of bolts 16 to form the respective endless belt.

Each endless belt is connected to its respective next adjacent endless belts by the connector strip 14 and at spaced positions along its length by additional short strap connectors 18 so as to connect the endless belts for common movement around the rollers and to essentially make the belt assembly functionally rotate around the rollers as a one piece assembly.

Each belt carries on its exterior surface an array of pick-up fingers 19 inclined rearwardly and outwardly of the belt surface 20 of a conventional nature. The fingers are formed in pairs 19A and 19B mounted at spaced positions on a base 19C which is bolted to the draper belt. The fingers are cranked at a mid point 19D to form an outer part 19E of larger angle to the surface 20

Figure 2:
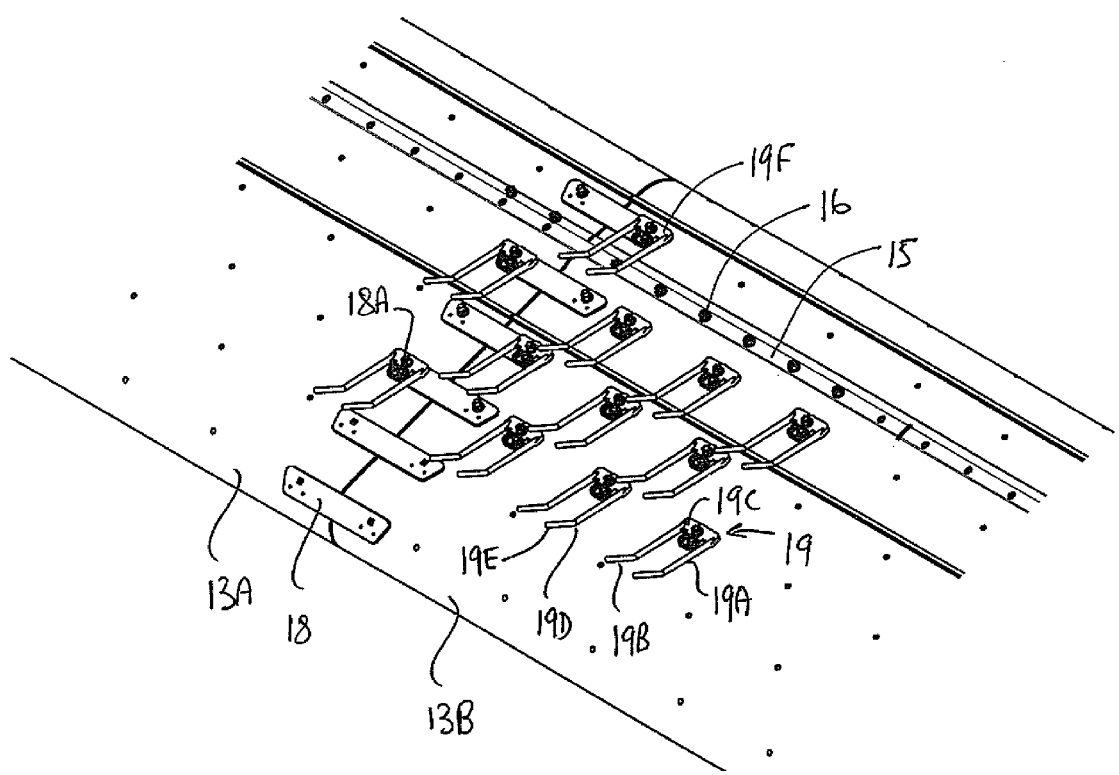
FIG. 2 is a similar isometric view of an intermediate part only of the embodiment of FIG. 1.
Figure 3:
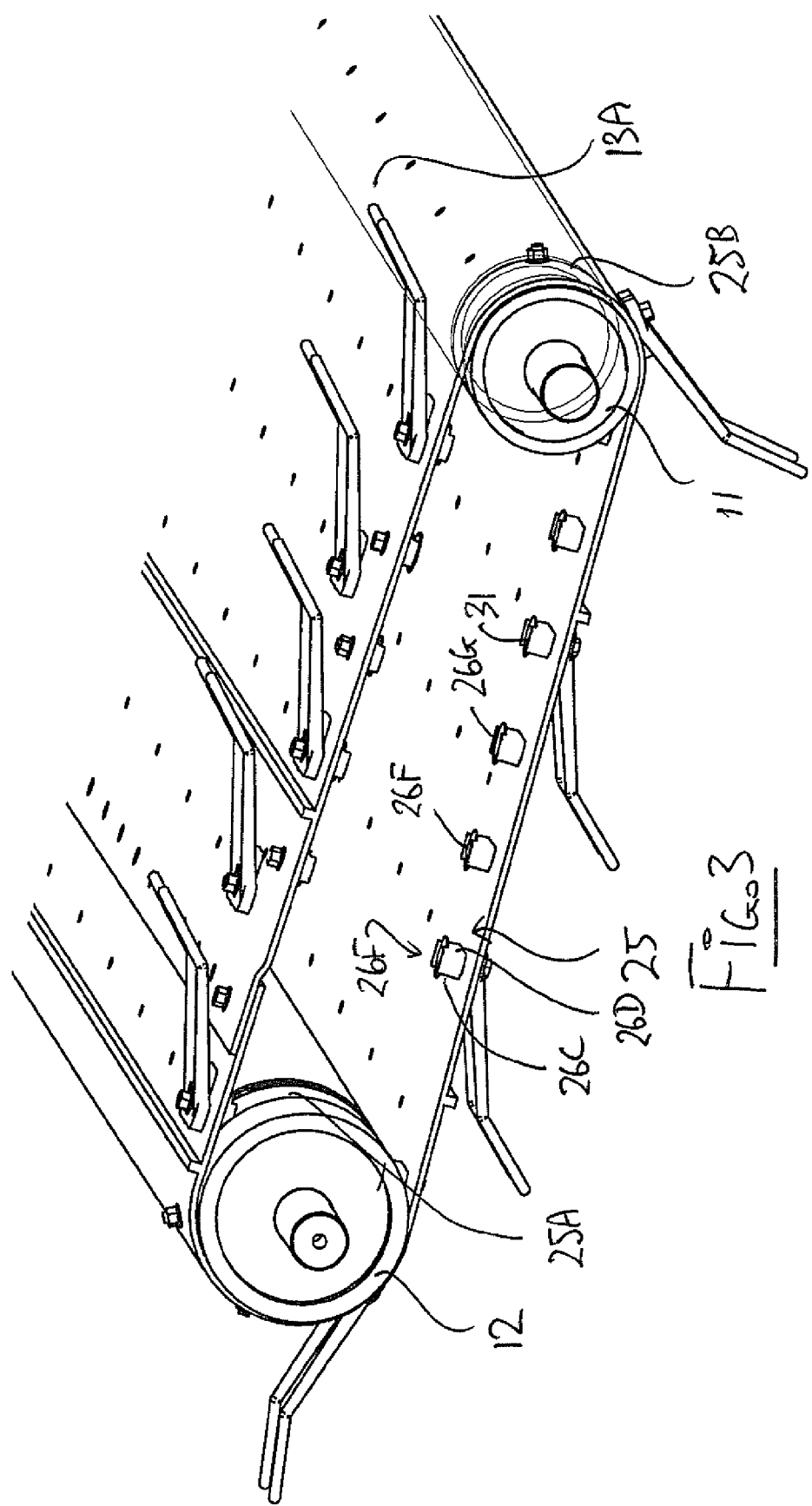
FIG. 3 is a similar isometric view of an end part only of the embodiment of FIG. 1.

As best shown in FIG. 2, the belts are connected side by side by firstly the splicing connector strip 15 connecting the ends of the belt lengths and spanning across from one belt 13B to the next 13A. The splicing connector 15 extends from an end 15A at a mid span of one belt to an end 15B mid span of the next. This continuation of connector strip 15 is used to join and span belts 13B and 13C and also belts 13C and 13D. The middle three connectors are for example 1123 mm long (44.2 inches) 42 mm wide (1.65 inches) with three bends put in using forming die. Three of these are used to join the four drapers and two additional 536 connectors 15C are used at the outer ends.

The endless belts are connected additionally by the plurality of plates 18 arranged in a row at longitudinally spaced positions along the belts 13A and 13B and spanning the edges of the belts. The plates 18 are of sufficient length only to reach onto the next belt and to provide a connecting point 19F for the first row of Finger 19 on one belt and to provide a connecting bolt 18A on the other belt. The number of plates is selected relative to the array of fingers 19 so that each is fastened at one end only to the finger 19 and at the other end is fastened to the belt without a finger 19. Further plates 18 are used to join belts 13B and 13C and also belts 13C and 13D.

The intermediate belts 13B and 13C are connected by the connecting strips 15 such that the belt length thereof is shorter than the belt length of the two side belts.

A tracking guide device 25 is provided at one point on the assembly for tracking the common belt assembly on the rollers. This is defined by a peripherally extending guide groove 25A in the rear drive roller 12 and a groove 25B in the front roller 11 rollers together with a guide assembly 26 mounted on an inside surface of one of the endless belts for tracking in the guide grooves.

The tracking guide device 26 is defined by a plurality of guide elements 26E mounted in a row on an inside surface of the end belt 13A of the endless draper belt assembly at longitudinally spaced positions along the belt length.

Each guide elements comprises a plastic molded body of generally oval shape bolted to the inside surface of the belt so that each is spaced from the next along the belt. The guide element has sides 26A and 26B for engaging sides of the grooves. The guide element has a front and rear wall 26C and 26D extending in a direction across the belt.

The grooves 25A and 25B each have tapered side walls 27 and 28 with the taper angle A is in the range 10 to 20 degrees and preferably of the order of 15 degrees. The elements have matching tapered sides 26A and 26B but are narrower than the groove by a distance of the order of 0.125 inch for clearance.

The width of the guide elements is therefore governed by the width of the groove and the guide elements are wider in the transverse direction than they are long in the longitudinal direction so that they are relatively short so as to avoid interfering with the bend of the draper belt as it passes around the rollers.

Thus the guide elements are typically less than 20 mm in length and preferably of the order of 16 mm to enable the belt to conform to the roller diameter. In comparison, the guide elements are greater than 30 mm in width and preferably of the order of 36 mm.

The guide elements are fastened by a single bolt 29 through the guide element and through the belt to a nut 30. The bolt has a round flat head 31 which is recessed into an interior 32 of the guide element 26E. The guide elements 26E are formed with at least one and preferably two prong protrusions 31A, 32A molded into the face of the element at the belt at a side of the bolt 29 that engage into the surface of the draper belt to prevent rotation of the guide element 26E on the draper belt to ensure its proper orientation for tracking in the grooves.

Some of the bolts 29 connecting the guide elements to the belt assembly also are arranged to attach a respective one of the finger members 19 to the draper. As the number of guide elements 26E required is greater than the number of fingers in the array, there is are typically two additional guide elements 26F and 26G between each finger member 19 and the next.

In order to provide effective and accurate tracking, it is highly desirable that the row of guide elements is arranged so that there are least two guide elements in the groove 25A at any point in time.

The guide elements have a depth into the groove of at least 10 mm and preferably of the order of 14 mm to not only contain the guide element inside the roller groove but also to sufficient surface area on sides of the guide element relative to the groove to achieve acceptable wear.

In order to provide a width of the pick-up of the order of 16 feet, the widest drapers available can be used which are 4 feet wide which allows the number of draper belts to be reduced to four. The drapers are connected end for end with the center two drapers 13B, 13C being assembled to a slightly shorter overall length with the difference in length between the intermediate belts and the end belts being of the order of 15.4 mm. This shorter assembled length results in similar draper tension to the outer draper belts 13A and 13D while accommodating the inherent deflection of the two rollers 11 and 12 under tension.

The end joiner 14 which connects the draper belts end to end spans across two drapers. In addition to the joiner 14 connecting adjacent drapers the numerous metal straps 18 acts to join the drapers.

The slippage issue is then addressed by having the center drapers assembled to a shorter assembled length and by joining the four drapers to essentially make it a functionally one piece draper.

The tracking issue is resolved by attaching in a row the plastic guide elements 26E to the underside of the draper. These guides are restrained in the v-groove 25A in the larger 5" drive roller. The guide elements have a 15 degree side taper in the roller groove which restrain the draper assembly from wandering laterally if deck is twisted or the roller tension at roller side structure is not guiding draper assembly adequately.

The customer can adjust the tension in the belts by adjusting the spacing between the rollers 11 and 12 to desired amount so that draper never slips under any condition but keep low enough draper tensions so as to not cause undue stress on draper or roller connections. The system allows the simple one piece rollers to naturally deflect without concern of the center draper belts not being tensioned to same degree as outer two. The system no longer requires outer roller tension to be so precisely fine tuned to get the draper to center position itself between outer end roller supports. This system allows customer to run the pickup deck twisted so that the rollers 11 and 12 are slightly out of parallel for a long time without any concerns of draper shifting laterally resulting in draper wear/failure. The plastic guide elements in the steel roller grooves at outer end reduces or eliminates all the edge draper wear.

The joining of the four drapers with the connector 15 splicing from mid span of one draper to mid span of next, plus the small sheet metal plates 18 at 4 inch spacing; essentially turns the four drapers into one. Assembling the two middle drapers to a slightly shorter assembled length keeps the draper tension similar on all four despite the roller tube bow or bending from the draper pull. The assembly of inner two drapers to a shorter assembled length allows thinner wall tubing to accept less bending strength and to accept therefore the shorter roller to roller dimension in middle. The overall assembled draper length on center two drapers is typically 15.4 mm shorter than outer two. The draper tension is controlled by pushing apart the roller weldments outer supports, at deck side structure. Sufficient draper tension is required to ensure drapers do not slip on rollers when enough resistant crop load is applied, but not so much so as to shorten draper life or overstress roller or roller support components. By joining the drapers, any heavy loads at the center belts 13B and 13C prompting slippage is now be resisted by the outer drapers 13A and 13D. The joining of the drapers also prevents crop debris from getting inside the draper assembly and building up on the rollers. Build-up of material on the rollers can cause conveying issues and tracking issues and damage to drapers.

The plastic guide elements bolted to the underside of the draper edge are typically spaced 66 mm apart and are short (16 mm) to enable the draper to conform to the roller diameter. The guides are wide (36 mm) to keep the guide from turning as it is going around the rollers as this would not allow the draper to conform to roller radius. The guides also have two prong protrusions that engage into the draper and assist in keeping guide from rotating. The elevator bolt head is in the interior of the guide to ensure there is no contact with roller. The guide has square hole that the square neck of elevator bolt goes into. Assembly requires holding the plastic guide as the nut is tightened on top side of draper (or top side of finger). There are always at least two guides in the drive roller groove at any point in time. Some guides are connected to the draper with same bolt that is attaching finger. In between these before mentioned guides are two guides attached to the draper. There are therefore typically 18 guides on the outside draper. Thus if roller to roller distance were increased the number of guides should be increased as it is desirable to have at least 2 guides in drive roller groove at all times to ensure tracking is maintained. These guides which are restricted in the drive roller groove control the lateral position of the four joined drapers and make sure the outer edge of the draper doesn't contact side structure, which could result in draper damage. An offset flange (not shown) is provided in the side structure to deflect crop from getting to the outer edge of the draper and hence getting underneath the draper.

The idler roller groove is wider than the drive roller groove to allow deck structure twist (allow wheels to follow rolling ground terrain) and allow draper to laterally shift slightly on the idler roller. The sides of the idler groove never touch the sides of the guide elements. The narrower drive roller groove controls the position of the draper assembly.

Uneven ground terrain can twist the support deck structure resulting in misalignment of the front and rear rollers. This twisting of the deck encourages the draper to shift laterally. Also a short wide draper is extremely difficult to control lateral positioning. The plastic guides in the drive roller groove guide into groove as guide approaches and engages into roller groove. A lesser angle than 15 degrees would allow guide to get up onto roller outside diameter. An increase in angle would not provide enough side support to contain guides inside groove, especially if deck assembly is left twisted for a long period of time. The 14 mm depth of guide is also important to not only contain guide inside roller groove but to provide enough surface area on the sides of the plastic member to achieve acceptable wear.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A crop pick-up for a harvesting machine comprising:
a front roller;
a rear roller parallel to and spaced from the front roller;
one of the front and rear rollers being a driven roller for driven rotation around its axis;
an endless draper belt assembly wrapped around the front and rear rollers so that rotation of the driven roller acts to drive the belt assembly to carry crop rearwardly from the front roller to the rear roller;
the endless draper belt assembly comprising a plurality of endless belts arranged side by side across the front and rear rollers so as to define two side belts and at least one intermediate belt;
each belt comprising a belt length wrapped around the rollers and connected at ends of the belt length to form the respective endless belt;
each endless belt being connected to its respective next adjacent endless belts at spaced positions along its length so as to connect the endless belts for common movement around the rollers;
each of the front and rear rollers having a peripherally extending guide groove therein;
and a plurality of guide elements mounted in a row along an inside surface of one of the endless belts for tracking in the guide grooves in the front and rear rollers;
the guide elements being separate each from the next so as to be fastened at spaced positions along said one of the endless belts;
the guide elements being fastened each by a respective separate fastener passing through said one of the endless belts.

2. The pick-up according to claim 1 wherein the guide groove of one of the rollers is wider than the guide groove of the other of the rollers.

3. The pick-up according to claim 1 wherein the groove has tapered side walls.

4. The pick-up according to claim 3 wherein the taper is in the range 10 to 20 degrees.

5. The pick-up according to claim 1 wherein the guide elements are wider in the transverse direction than they are long in the longitudinal direction.

6. The pick-up according to claim 5 wherein the guide elements are less than 20 mm in length.

7. The pick-up according to claim 5 wherein the guide elements are greater than 30 mm in width.

8. The pick-up according to claim 1 wherein the guide elements are fastened by a single bolt through the guide element and through said one of the endless belts.

9. The pick-up according to claim 8 wherein the guide elements have at least one and preferably two prong protrusions at a side of the bolt that engage into said one of the endless belts to prevent rotation of the guide element on said one of the endless belts.

10. The pick-up according to claim 8 wherein the bolt has a head which is recessed into an interior of the guide.

11. The pick-up according to claim 1 wherein said one of the endless belts carries a plurality of spaced finger members on an exterior surface thereof and wherein each respective fastener connecting a respective one of the guide elements to said one of the endless belts also is arranged to attach a respective one of the finger members to said one of the endless belts.

12. The pick-up according to claim 11 wherein the row of guide elements includes at least one additional guide element between each finger member and the next.

13. The pick-up according to claim 1 wherein the row of guide elements is arranged so that there are least two guide elements in the groove at any point in time.

14. The pick-up according to claim 1 wherein the guide elements are made of a plastics material.

15. The pick-up according to claim 1 wherein the guide elements have a depth into the groove of at least 10 mm.

16. The pick-up according to claim 1 wherein the endless belts are connected to essentially make the belt assembly functionally rotate around the rollers as a one piece assembly.

17. The pick-up according to claim 16 wherein the endless belts are connected by a splicing connector connecting the ends of the endless belts and spanning across from one of the endless belts to the next.

18. The pick-up according to claim 17 wherein the splicing connector extends from a mid span of one of the endless belts to a mid span of the next.

19. The pick-up according to claim 18 wherein the endless belts are connected additionally by a plurality of plates at longitudinally spaced positions along the endless belts and spanning the edges of the endless belts.

* * * * *